Jan. 30, 1968 G. COTE 3,365,748
BLOW-MOLDING MACHINE
Filed July 28, 1964 6 Sheets-Sheet 4

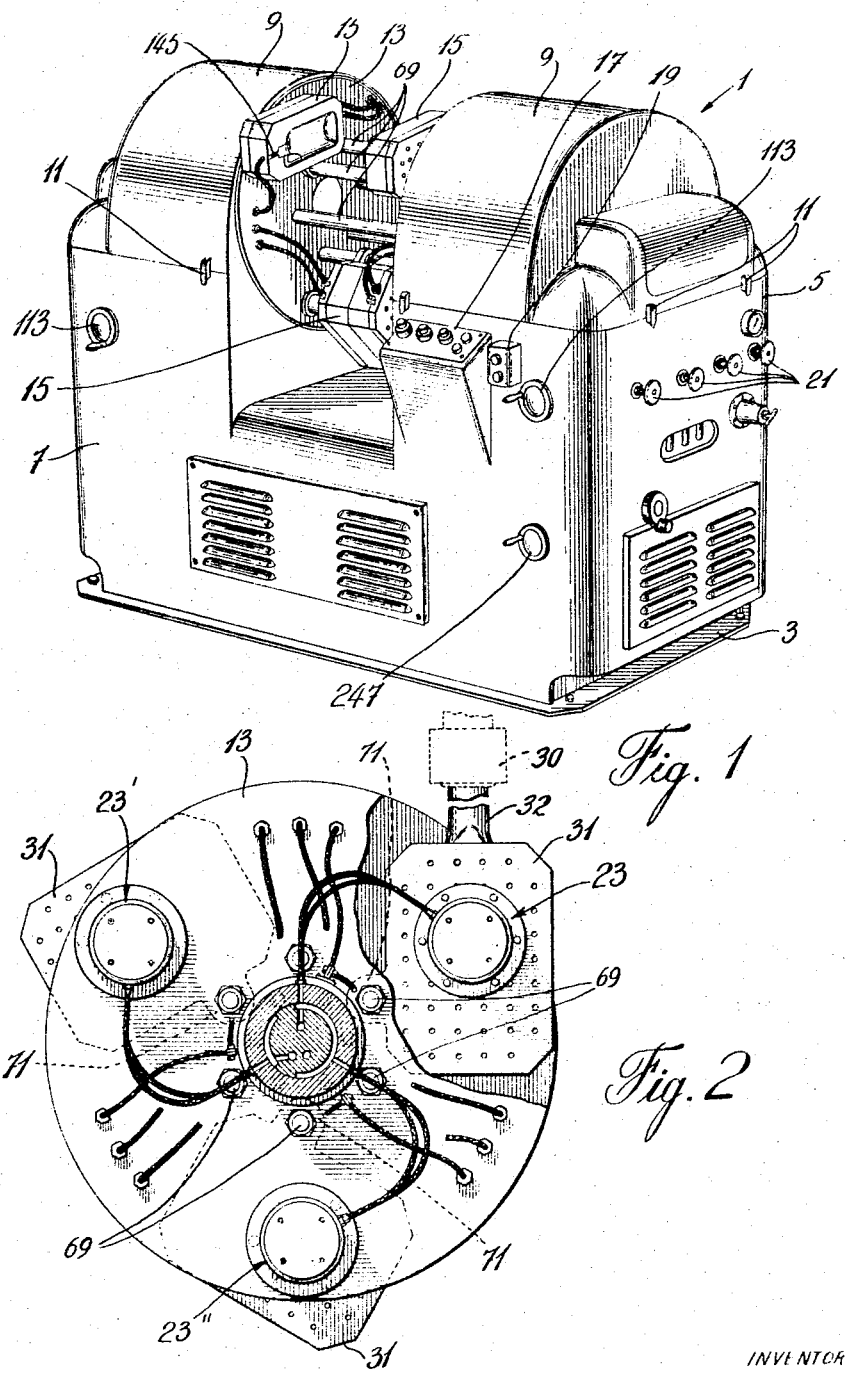

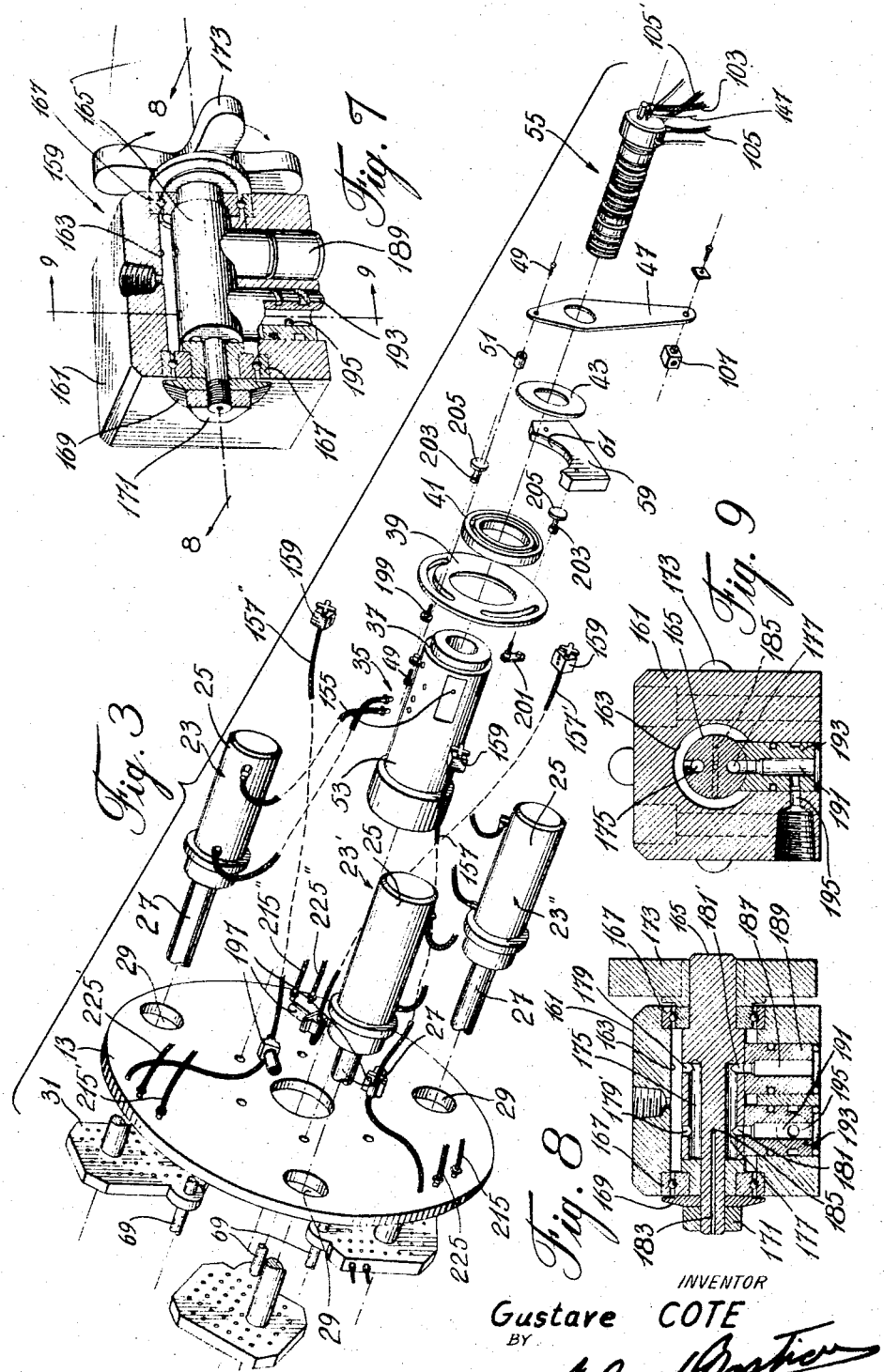

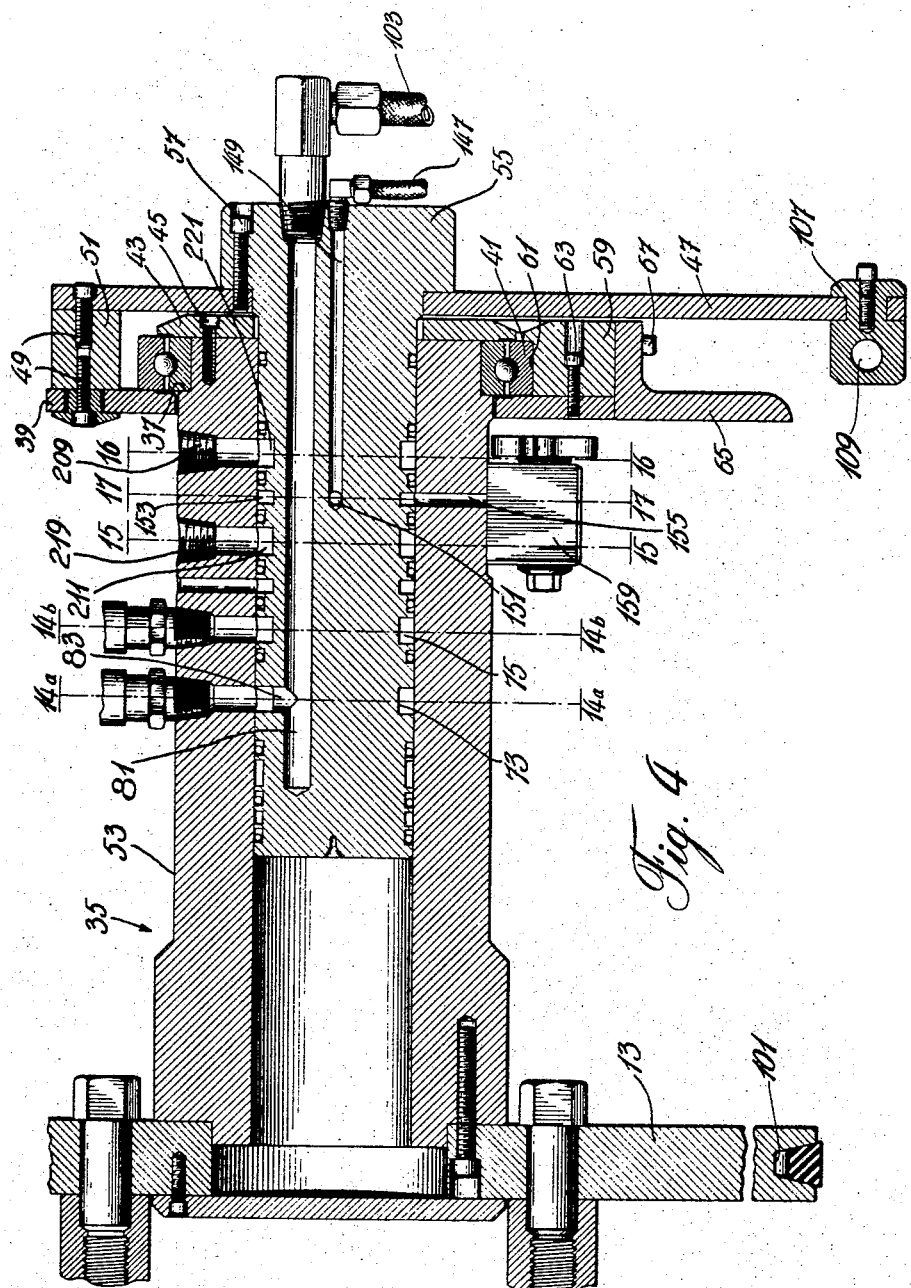

INVENTOR
Gustave COTE
BY
ATTORNEYS

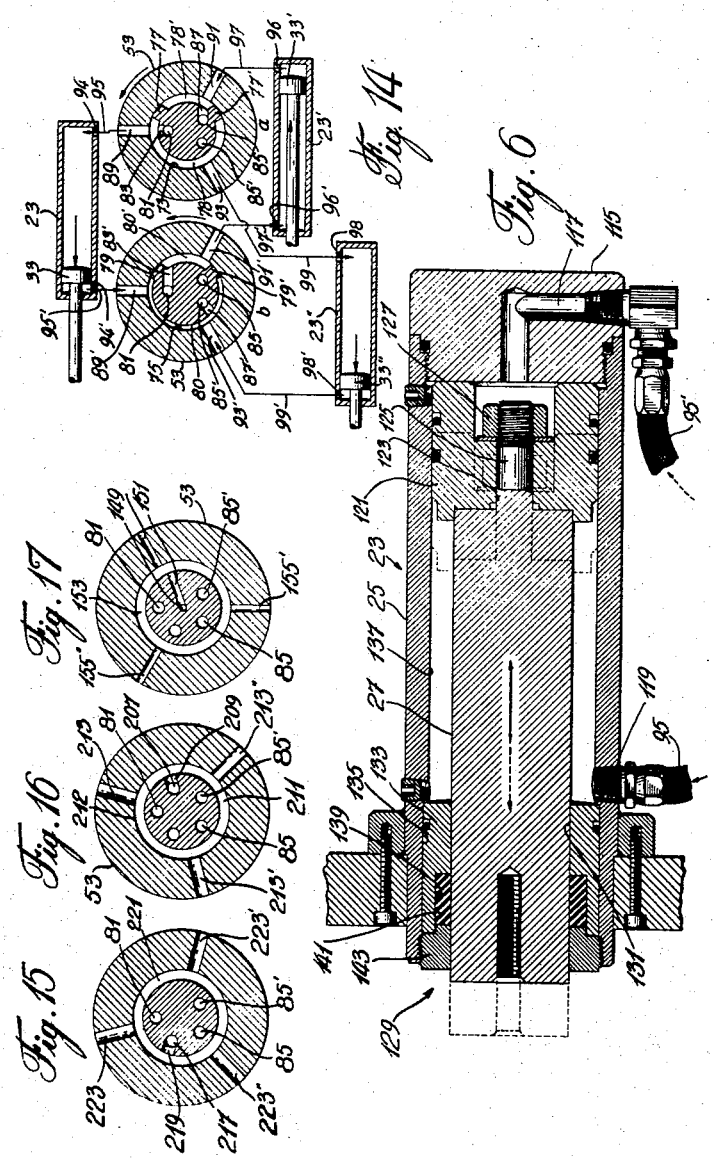

Jan. 30, 1968     G. COTE     3,365,748
BLOW-MOLDING MACHINE
Filed July 28, 1964     6 Sheets-Sheet 6

INVENTOR
Gustave COTE
BY
ATTORNEYS

United States Patent Office 3,365,748
Patented Jan. 30, 1968

3,365,748
BLOW-MOLDING MACHINE
Gustav Cote, Ste-Claire, county of Dorchester,
Quebec, Canada
Filed July 28, 1964, Ser. No. 385,570
16 Claims. (Cl. 18—5)

The present invention relates to a new blow-molding machine of the rotative type adapted for molding of hollow articles such as bottles.

The machine to which this invention is directed is of the general type wherein a plastic parison is introduced between the two dies of the blow mold which is then closed by allowing the two dies to come one against the other. Air is thereafter introduced into the parison in the mold whereby to force the plastic layer of the parison against the dies cavity surfaces. After remaining in the mold a certain time for allowing proper shaping and cooling, the mold is open and the article is removed.

A main object of the invention consists in providing such a blow-molding machine which is completely mechanical, using hydraulic power for actuation of the mold dies. Consequently, the machine of the present invention does not require any of the troublesome electrical elements of the standard machines of this type such as timers, electric valves, contactors or interruptors, etc.

Also, the machine of the invention may use a plurality of blow molds all of which may be in operation or only one or a limited number of which can be operated while the remaining ones remain inactive.

Another object of the invention resides in the provision of a machine of the above type which operates continuously, that is, requires no stoppages for any of the molding stations.

Still another object of the invention resides in the provision of a blow-molding machine having means thereon to automatically and simultaneously change the inclination of the dies in closed position whereby non-symmetrical articles may be formed.

Yet another object of the invention consists in providing such a machine preferably made for molding three articles in rotation and wherein two articles are cooled simultaneously during one cycle.

Generally, therefore, the advantages offered by the machine of the invention in comparison with already known machines of this type reside in that, being mechanically constructed and operated, it is much less likely to break down as compared to electrically operated machines and it can also be more easily adjusted than standard known machines.

The above noted advantages and objects may be obtained in a blow-molding machine made according to the invention which comprises: at least one blow mold, usually three, formed by a pair of cooperating dies each of which is mounted on two rotating parallel plates; a hydraulic ram for each die adapted to cause displacement of the dies toward and away from one another so as to open and close the mold, each ram having two fluid inlet and outlet ends; a controller on each side of the two plates for controlling admission and exhaust of the oil to and from each ram; the controller comprising: a cylindrical fluid distributor, an outer sleeve mounted for rotation over the distributor and connected to the corresponding plate, means providing fluid pressure admission and fluid exhaust through the distributor and sleeve successively delivering and exhausting fluid alternatively at each fluid inlet and outlet end to thus cause reciprocation of the dies to open and close the mold.

The pressure fluid admission and exhaust means comprises several ducts through the outer sleeve so distributed there around that during the rotation of the sleeve they successively come into communication with admission and exhaust to provide the above-mentioned reciprocation, these ducts being so synchronized that there are always two closed molds while a third mold is open for delivery of the molded article.

The invention further comprises the provision of air delivery means through the controller and to each mold, the said delivery means being synchronized with the opening and closing of molds whereby air is blown into the article being formed only when the molds are closed.

Finally, water circulation means is contemplated in the machine of the invention and through the said controller to ensure proper cooling of the molds all through the cycle thereof.

It is believed that a better understanding of the invention will be afforded by the description that follows having reference to the appended drawing illustrating a preferred embodiment of the invention, and wherein:

FIG. 1 is a perspective view of the machine of the invention;

FIG. 2 is an end view of the upper part of the machine of FIG. 1 with the respective cover and part of the nearer mold mounting plate removed, and in cross-section through the corresponding controller;

FIG. 3 is an exploded view of the parts shown in FIG. 2;

FIG. 4 is a transverse cross-sectional view of the controller of FIG. 2;

FIG. 6 is a longitudinal cross-sectional view of one die hydraulic operating ram of FIGS. 2 and 3;

FIG. 7 is a perspective and partially cross-sectional view of the air control valve shown in FIGS. 3, 4 and 5;

Figure 10:
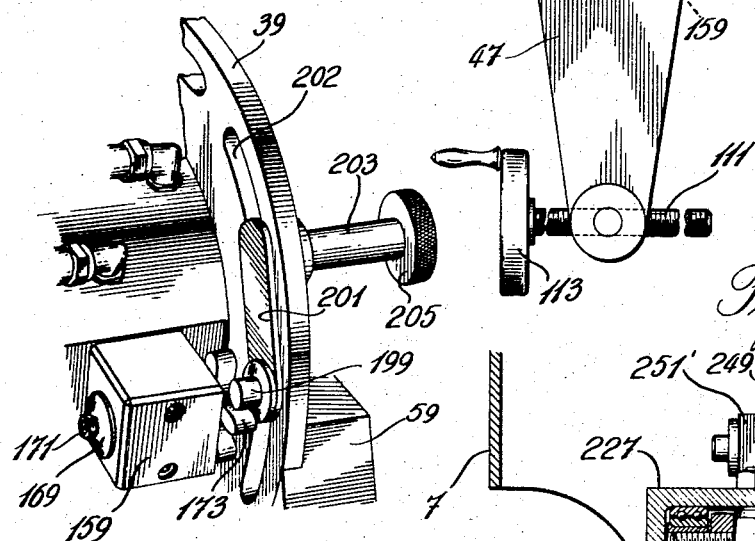
Figure 11:
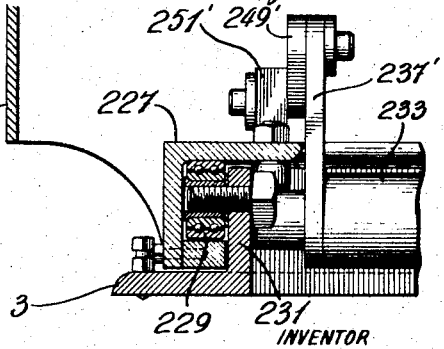
Figure 12:
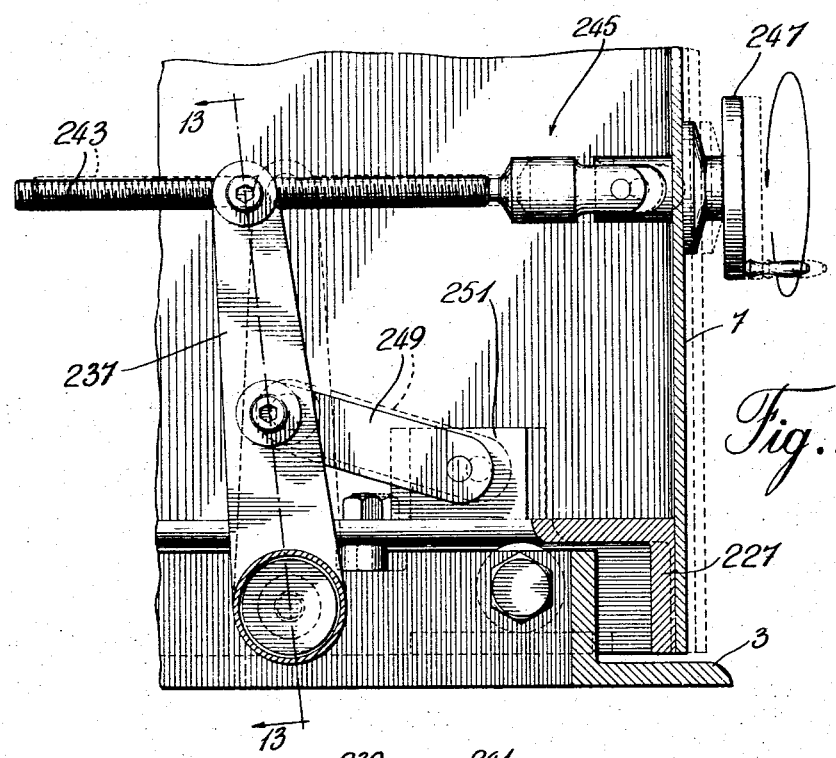
Figure 13:
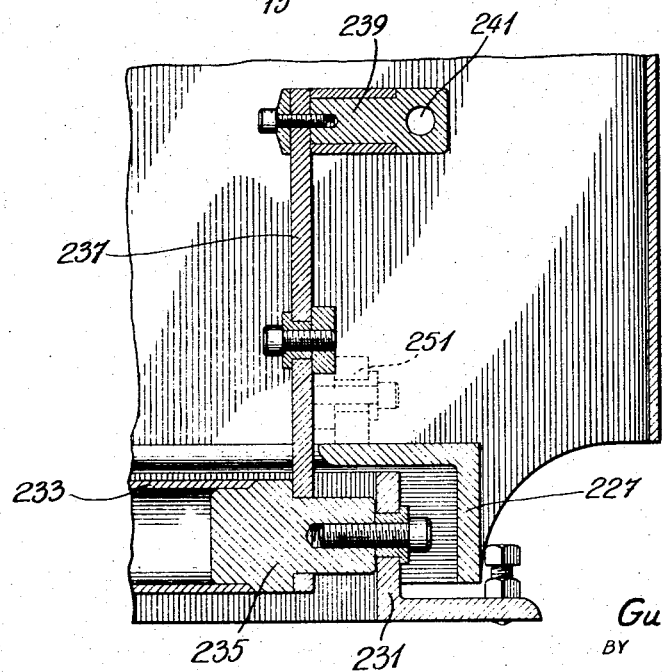

FIGS. 8 and 9 are cross-sectional views taken along lines 8—8 and 9—9 respectively of FIG. 7;

FIG. 10 is a perspective view of that part of the machine intended for the control of the air valve;

FIG. 11 is a partial cross-sectional view through one corner of the machine base;

FIG. 12 is a cross-sectional view through another corner of the machine base, taken at right angles to the cross-section view of FIG. 11;

FIG. 13 is a cross-sectional view taken along line 13—13 of FIG. 12;

FIG. 14 is a schematic ilustration of the operation of the controller and three die displacing rams including two cross-sections $a$ and $b$ generally taken along lines 14$a$—14$a$ and 14$b$—14$b$ respectively of FIG. 4;

FIGS. 15, 16 and 17 are cross-sectional views taken along lines 15—15, 16—16 and 17—17 respectively of FIG. 4.

A general description of the machine according to the invention, will first be given, after which it is believed best to describe the details of the mechanism thereof by dividing it into its three main parts: the operating fluid system or hydraulic system; the air delivery system and the water cooling system.

General description

The machine 1 of the invention is generally formed of a body including a base 3 over which rests a generally U-shaped casing 5 formed of a lower housing 7 and two generally half-cylindrical covers 9. It will be noted that the said covers 9 are releasably mounted over the lower housing 7 by means of any conventional locking member 11.

Within the bight of the U-shaped body 1, there is provided a pair of spaced upright rotatable plates 13 on the inner face of which can be seen an open mold and a closed mold each formed of two molding dies 15 to be referred to again later. It should be understood at this time that during operation, the plates rotate at equal speed and carry with them the molding dies 15. A plastic parison 32 from the extruding nozzle 30 of an extruding machine (not shown) hangs between the said two plates 13 and the dies 15 so arranged as to close whenever they reach the location where the parison is discharged from the extruder. The location of the extruder nozzle 30 and parison 32 is somewhat rearwardly of the machine illustrated in FIG. 1 and slightly below the top of cylindrical covers 9 as shown in FIG. 2. As mentioned previously, in cases where non-symmetrical articles are to be molded, dies 15 are usually adjusted to close slightly before or after reaching the normal molding station whereby the said dies are inclined in relation to the plastic parison.

An operating control board 17 and other switches 19 are provided in front of the machine generally close to the bight of the U-shaped casing. Similarly, a set of hydraulic valves and control knobs 21 can be seen on one side wall of the machine.

Reference will now be made to FIG. 3 which illustrates an exploded view of the assembly composed of a controller, three rams, plate 13 and a set of die molding plates.

The following description will be made of a machine using three blow-molds although it should be understood that more or less molds could be used. Also the machine can be operated with only one mold or with less than the actual total number of molds.

In the preferred embodiment of the invention, three pairs of rams are used, three rams 23, 23', 23" being mounted on each plate 13 to correspond to three half molds or dies 15. Each ram comprises an outer cylinder 25 adapted to be secured to plate 13, a piston rod 27 projecting out of cylinder 25 and extending through an aperture 29 in plate 13. Piston rods 27 are connected at one end to the die structures and more specifically to the die holding plates 31 to which the dies 15 are fastened.

Each ram also includes a piston 33 (see FIG. 6).

Centrally of each plate 13 is mounted a fluid controller 35 in the manner more specifically illustrated in FIG. 4. Over the rear end of fluid controller 35, immediately forwardly of a shoulder 37 formed by a reduced diameter portion of the said controller, sits an annular plate 39 and a ball bearing 41 is received over the said shoulder 37. Behind ball bearing 41 is a washer 43 secured to one end face of the controller 35 by means of a set of screws 45 (see FIG. 4) to retain ball bearing 41 in position. Behind washer 43 is a control lever 47 for a purpose to be determined later, the said control being held fast to annular plate 39 by means of screws 49 threading into a spacer block 51 (see FIG. 4 again).

It should be pointed out at this time that each controller 35 is made up of two main parts, an outer sleeve 53 directly connected to plate 13 and consequently rotatable therewith and a stationary cylindrical fluid distributor 55, detailed description of both of which will be given hereinafter.

Fluid distributor 55 fits into outer sleeve 53 by sliding successively through control lever 47 and washer 43. It is held fast on control lever 47 by means of set screws 57 (FIG. 4). The above-described assembly is adapted to lie on a support 59 having an arcuate rest 61 over which lies the above-mentioned ball bearing 41; the said support 59 being fastened to annular plate 39 by means of set screws 63 (FIG. 4). Finally, the whole above-described assembly of the die holding plates 31, plate 13, rams 23 and controller 35 is fixed to the frame structure represented in FIG. 4 by the angular member 65 to which support 59 is secured by any suitable means such as screws 67.

From the above description, it should be noted that while the outer sleeve 53 of controller 35 is rotatable through roller bearing 41, the fluid distributor 55 is fixed relative thereto although rotationally adjustable by means of the control lever 47 as will hereinafter be described.

Referring again to FIG. 1, it will be seen that plates 13 are interconnected by means of a series of connecting rods 69 also illustrated in FIG. 2. Each die holding plate 31 has an ear 71 formed along one inner lateral edge thereof with a central aperture whereby the said plates 31 are slidably displaceable in pairs along an equal number of connecting rods 69 when they are moved toward and away from one another by the rams 23.

Consequently, plates 13 and outer sleeves 53 (each secured to the respective plates 13 in the manner shown in FIG. 4) rotate as one member and are supported solely by angular members 65 located at the ends of the machine.

Hydraulic system

The operating heart of the machine is in the previously mentioned hydraulic controllers 35, each of which comprises, as aforesaid, an annular outer sleeve 53 into the bore of which is received a stationary cylindrical hydraulic distributor 55.

The operating hydraulic circuit is as follows:

Each distributor 55 has a first circumferential groove 73 (FIGS. 4 and 14a) and a second circumferential groove 75 cut around the outer periphery thereof. A pair of barriers 77, 77' is provided in groove 73 to divide the said groove into a first chamber 78 and a second chamber 78'. Similarly, a pair of barriers 79, 79' is provided in second groove 75 to divide the latter into a first chamber 80 and a second chamber 80'. It will of course be understood that all four chambers are also defined by the bore of the outer sleeve 53.

It should be noted here that the length and position around distributor 55 of the first and second chambers 78, 78' of the first groove 73 correspond to those of the first and second chambers 80, 80' of second groove 75, respectively. Preferably, although not essentially, the ratio of the first chambers to the second chambers should be 2 to 1, approximately. It is however essential for the proper operation of the hydraulic system that the position and length around the distributor of the first and second chambers 78, 78' be respectively the same as those of the first and second chambers 80, 80'.

Pressure fluid admission channel means is provided through distributor 55 opening into the first chamber 78 of groove 73 and the second chamber 80' of groove 75. The said channel means is shown in FIGS. 4 and 14 a and b as comprising a longitudinal passage 81 and radial passages 83, 83' respectively corresponding to grooves 73 and 75.

Fluid return channel means is also provided through distributor 55 to open into the second chamber 78' of the first groove 73 and into the first chamber 80 of the second groove 75. More specifically, the said fluid return channel means comprises two longitudinal passages 85, 85', the former having a radial passage 87 opening into the second chamber 78' while the latter has a radial passage 87' opening into the second chamber 80.

Outer sleeve 53 has pairs of ducts corresponding in number to the number of rams 23 on one plate 13. Referring to the three rams of FIG. 14 by numerals 23, 23' and 23", it will be seen that a pair of radial ducts 89, 89' corresponds to ram 23; radial ducts 91, 91' correspond to ram 23' and radial ducts 93, 93' correspond to ram 23". Also, ducts 89, 91 and 93 of first groove 73 and 89', 91' and 93' of second groove 75 are evenly distributed around outer sleeve 53 and it should be noted that the positions around outer sleeve 53 of the ducts of each pair 89, 89'–91, 91'–93, 93' are side by side in the longitudinal direction as clearly shown in FIG. 14. This is to ensure proper functioning of the rams as will hereinafter be explained.

Fluid conduit means joins the various ducts to the respective rams; conduits 95, 95' joining ducts 89, 89' to ram 23; conduits 97, 97' joining ram 23' to ducts 91, 91' and conduits 99, 99' joining ducts 93, 93' to ram 23".

The assembly of plates 13 and outer sleeve 53 may be brought into continuous rotation by any convenient means. This could be by a drive belt brought into rotation through a speed reducer by a motor (not shown), the said belt engaging a groove 101 (FIG. 4) around the periphery of one of plates 13.

The hydraulic distribution system operates as follows: the operating hydraulic fluid, such as oil, is admitted under pressure through a piping connection 103 into longitudinal passage 81 of the pressure fluid admission channel means and is directed from there through radial passages 83, 83' into the first chamber 78 and the second chamber 80' which thus become pressure chambers. Reference being had to FIG. 14, it will be seen that the pressure fluid pushes piston 33 of ram 23 leftward, that is, in closed position of the mold.

It should be understood here that a similar but reverse movement is applied to a piston of the ram corresponding to ram 23 but located on the other side of the machine, that is, leftward of the first plate 13 of FIG. 1.

Figure 5:
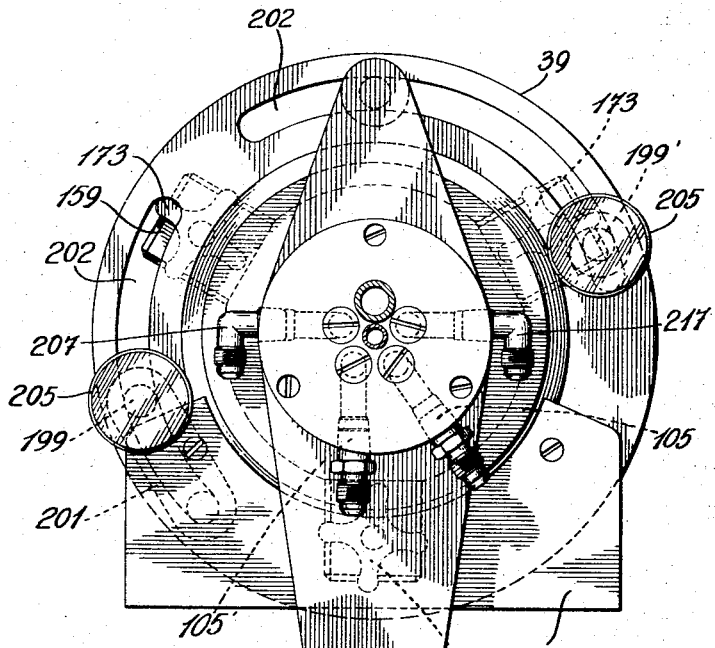
FIG. 5 is an end view of the controller part of the machine with the corresponding machine cover removed.

Simultaneously, the fluid forwardly of piston 33 is driven into the return channel means successively through first chamber 80, radial passage 87' and longitudinal return passage 85' to finally exhaust through the return piping 105' (see FIG. 5).

Simultaneously also and in the position shown in FIG. 14, piston 33' is driven rightward, that is, toward open position of the mold by the action of fluid pressure being admitted leftward of the said piston 33 through pressure chamber 80'. The latter movement has driven oil forwardly of piston 33' into the return chamber 78', radial passage 87 and longitudinal passage 85 of the return channel means to finally exhaust through the other return piping 105.

In a similar manner, piston 33" is driven leftward, as piston 33, by fluid pressure being derived from pressure or first chamber 78, the return of the oil on the other side of piston 33" taking place through the return channel means 87', 85'.

Consequently, during the whole period of time that ducts 89, 93, remain in first chamber 78, duct 91 in communication with the second chamber 78' and concurrently ducts 89', 93' remain in communication with second chamber 80, the three pistons will retain the position shown in FIG. 14. As outer sleeve 53 rotates through an angle of approximately 120° from that position, it will be seen that duct 93 will have moved from first chamber 78 into second chamber 78' while duct 91 will move from second chamber 78' to first chamber 78. Movement of the corresponding ducts 93' and 91' of groove 75 will be identical; ducts 89, 89' remaining in communication with chambers 78 and 80. Therefore, while piston 33 remains in the situation shown in FIG. 14, piston 33' moves to the left and piston 33" moves to the right.

In the position of FIG. 14, pistons 33 and 33" are in the closed position of their corresponding molds while piston 33' is in the open position thereof. After rotation of outer sleeve 53 by 120°, piston 33 and now piston 33' are in closed position of their corresponding molds while piston 33" is in the open position thereof.

Similarly, it could be shown that another 120° rotation of sleeve 53 will push piston 33 rightward to open position of the corresponding mold while the other two pistons 33' and 33" will be driven into closed position. This further rotation completing a cycle which repeats itself as long as the conditions remain as described above.

It may therefore be concluded that, with the above-described apparatus, there will always be two closed and one opened molds. Further study of this apparatus with particular reference to FIGS. 1, 2 and 14 will show that the molds are closed between slightly past the vertical center line and a position 240° in clockwise direction where they open. Therefore, opening of the molds happens at the station which is closest to the operator, that is in front of the machine and this will allow the operator to easily pick up the molded articles.

It may also be found convenient to cause angular displacement of chambers 78, 78', 80 and 80' from that shown in FIG. 14 in order to force closure of the molds earlier or later, depending on which inclination, in relation to the vertical, it is desired to give the said molds when they actually close. This may be necessary in certain cases where non-symmetrical articles are to be molded such as bottles with handles. This may be achieved by providing the aforementioned control lever 47 (FIG. 4) which is rigidly secured to fluid distributor 55 by means of screws 57 and which, through the ball bearing 41, can be made to rotate relatively to outer sleeve 53. It will be noted that the lower end of lever 47 is provided with a block 107 having an aperture 109 on one side thereof for the reception of a threaded rod 111 (FIG. 5) operable by means of a handle 113 which extends through the lower housing 7 shown in FIG. 1. Therefore, rotation of the said handle 113 will cause rocking of lever 47 and subsequent rotation of the fluid distributor 55. In this manner, by actuating simultaneously the two handles 113, one on either side of housing 7, it is possible to obtain angular displacement of the closing station of the molds. Also, by the same token, if it happens that the parison is extruded off center in relation to the bight of the U-shaped body 1, rotation of a single lever 113, causing equal rotation of one of the distributors 55, will force closing of the molds at a position off center in the said bight. Proper adjustment of the fluid distributor will afford to force proper closure of the mold in relation to the parison.

With the above description in mind, it will also be understood that it is possible to operate only one of the rams 23, 23', 23" by merely providing closure valves in the proper fluid conduits to cut off the related ram from the fluid supply and exhaust system.

Proper fluid ports 94, 94', 96, 96' and 98, 98' are provided at the ends of rams 23, 23' and 23" respectively.

It will also be understood, as aforesaid, that a greater or lesser number of rams may be added by merely distributing further fluid distribution ducts through outer sleeve 53 in the same number and relation as aforesaid. In the practice of the invention, it has however been found that three molds are preferred.

Fluid tightness between the fluid distributor and the rotating outer sleeve 53 is of course necessary and this is particularly so between the various radial channels. This may be achieved in any known manner and particularly by the use of O-rings as clearly shown in FIG. 4.

Finally, the fluid or oil circuit is completed by providing a suitable pump, the outlet of which may be connected with admission passages 81 of the distributors 53 while the suction connected to a reservoir receiving the fluid return from the return passages 85, 85'. It will be understood that the pump suction may be connected directly to the return passages 85, 85' if the oil system is completely filled.

A preferred ram construction is illustrated in FIG. 6 showing the cylinder 25 closed at one end by a cylindrical plug 115 through which extends a fluid admission and exhaust channel means 117 being fed by fluid conduit 95'. Near the other end of cylinder 25, there is provided an admission port 119 fed by another conduit 95 in the manner described above. The piston itself is formed as a cup-shaped member 121 having a hole 123 through the bottom thereof for the reception of a threaded pin 125 projecting from one end of piston rod 27. The said pin is secured in position by any known means such as by a nut 127.

Rod 27 is made slidable at the other end of cylinder 25 through a guiding bushing 129 having a bore 131 of substantial extent whereby to provide firm guiding and holding of rod 27.

The said bushing 129 is preferably formed of an inner angular part 133 received in an enlargement 135 of the bore 137 of cylinder 25. Annular part 133 itself is provided, through the bore thereof and at one end, with a groove 139 of substantial longitudinal extent for the reception of a rubber gasket 141. The bushing assembly is closed by a gland member 143 threadedly received at the end of cylinder 25.

Air delivery system

As previously described, when the parison is imprisoned into the closed mold, air is injected therein to force it to adapt itself to the contour of the mold cavity. The injecting device 145 (FIG. 1) itself is known and will not be described herein in detail. Attention will however be paid to the manner in which air is admitted and exhausted into and out of the molds.

Air is admitted into the fluid distributor 55 through a standard air hose means 147 which directs the air into the air channel means through the distributor which comprises a longitudinal channel 149 (FIGS. 4 and 17) and a radial air channel 151. As shown in FIG. 17, air channel 151 is constantly in communication with a third groove 153 provided circumferentially around the fluid distributor and defining an air chamber with the bore of outer sleeve 53. A series of air ducts 155, 155' and 155" (one for each mold and not one for each ram as is the case in the fluid distribution system) is provided circumferentially around distributor 55. Ducts 155, 155', 155" are preferably, although not essentially, evenly spaced around the periphery of distributor 55.

From the said air ducts, a series of hoses 157, 157' and 157" (see FIG. 3) direct the air toward their respective molds, it being understood that there need be only one air system per mold, as aforesaid.

The admission of air to the molds is regulated by means of air valves 159 connected in series in each of the aforesaid hoses 157, 157' and 157". Air valve 159 is particularly illustrated in FIGS. 7, 8 and 9 and will be seen to comprise a body 161 having a bore 163 into which is received a spool 165 rotatably mounted, in spaced relationship, in bore 163 by means of bearings 167. A washer 169 and a nut 171 threadedly received at one end of spool 165 serve to close one end of bore 163 while the other end is closed by a Geneva-wheel type of handle 173 secured to spool 165 in any known manner whereby rotation of the Geneva-wheel handle 173 will produce rotation of spool 165.

A pair of longitudinal air inlet 175, 177 are provided through spool 165 adjacent the periphery thereof and along a diametral plane. It will be noted that inlets 175, 177 are provided only in the central longitudinal part of spool 165 adjacent the periphery thereof and along a diametral plane. It will be noted that inlets 175, 177 are provided only in the central longitudinal part of spool 165 and further have two pairs of spaced radial passages 179, 179', 181 and 181' to connect them to inlet and exhaust as will hereinafter be explained.

The end of spool 165 having nut 171 has an axial air exhaust passage 183 which communicates with a diametrical air passage 185 disposed at right angles to and between longitudinal air inlet passages 175, 177 are best seen in FIG. 9.

Air is admitted into body 161 by means of a duct 187 which is the bore of a sleeve 189 slidable in a suitable aperture through body 161. Similarly, air is exhausted through a duct 191 which is the bore of a sleeve 193; ducts 187 and 191 being parallel with one another. Air comes out of body 161 through an opening 195 at right angles to bore 191 and best seen in FIG. 9. It should be noted here that while the free end of sleeve 189 is open for admission of air, being applied against one of the air channels 155, 155', 155" (FIG. 4) the free end of sleeve 193 is closed by the wall of outer sleeve 53 (FIG. 4) and air can only exhaust through opening 195.

A quick discharge valve 197 is also provided in series through each of hoses 157, 157', 157", downstream of air valve 159 just described. No description of this quick discharge valve 197 will be given as it is standard, it being understood that it will allow flow of air in one direction only and will discharge their located downstream thereof rapidly upon a drop of pressure in the conduit located upstream thereof.

Operation of the air valve 159 previously described is as follows.

In the situation of FIG. 8, air is admitted through ducts 187, air inlet passages 181', 177 and 181 into duct 191 through opening 195, through quick discharge valve 197 and finally discharged into the appropriate blow mold through the aforesaid injection device 145 (FIG. 1). Upon a certain rotation of outer sleeve 53 on which air valves 159 are mounted (see FIG. 4) Geneva-wheel handle 173 is operated to rotate spool 165 by 90°. This cuts off duct 191 and consequently opening 195 and the molds from the air supply through duct 187 as will be appreciated particularly from FIGS. 8 and 9. Also, this places opening 195, duct 191 and consequently the part of the corresponding air hose 157, upstream of valve 197 in communication with the exhaust passageway 183. Thus, the upstream portion of hose 157 experiences a drop in pressure which causes actuation of valve 197 to exhaust the air downstream thereof and in the mold.

Further rotation by 90° of spool 165 will again place the mold under air pressure while another rotation of 90° will place it in communication with exhaust. A complete cycle of rotation of spool 165 will therefore place the corresponding mold in communication with air twice and with exhaust also twice in alternative fashion.

In the embodiment illustrated, considering that there are three molds, two of which are to be constantly closed, it is preferable that air pressure be kept in the closed mold during their full time of closure and placed with air exhaust in the remaining one third of the cycle period. This is achieved by providing a pair of actuators, one controlling air admission to the molds and the other controlling air exhaust therefrom. The mechanism is particularly illustrated in FIGS. 5 and 10 and will be seen to generally consist of an actuating prong 199 adjustably secured on the afore-mentioned annular plate 39 (see FIGS. 4 and 5).

Because of support 59 (FIGS. 5 and 10) which may stand in the way, it may be necessary to mount one prong 199 at one end of a rigid member 201, the other end of which being secured to a tightening handle means 203 including a knob 205. It will be understood that upon rotation of knob 205, tightening means 203 which need not be described in details since it is of a standard and conventional nature, will clamp rigid member 201 and consequently prong 199 in position in slot 202 through annular plate 39. The other prong 199' (FIG. 5) being located at 180° from the first prong 199 and out of the way of support 59 need not be provided with the above-described adjusting mechanism.

It will be noted here that air is supplied to the mold actually for an extent of 180° whereas the molds are closed for an extent of 240°. This may not be deemed sufficient and if a longer time period is required for blowing air into the mold, this may easily be done by shifting one of the prongs 199 around annular plate 39 through one of the slots 202 whereby to increase the length of time of blowing air into the molds.

Water cooling delivery system

This system operates in a manner very similar to that described in relation with air except that cooling being continuous, no control thereover is necessary except at the inlet.

Water is admitted in distributor 53 through a water admission channel means comprising a longitudinal channel 207 (FIG. 16) and a radial channel 209 opening into a fourth groove 212 forming, with the bore of distributor 53 a water distribution chamber 211 which communicates with a set of three radial water supply ducts 213, 213', 213". To these ducts are connected water supply hoses 215, 215', 215" (FIG. 3) which lead to the die holding plates 31 and dies 15 provided with suitable cooling channels (not shown). Water which has cooled the dies and holding plates return through hoses 225, 225', and 225"

respectively connected to the water return of exhaust ducts 223, 223', 223'' (FIG. 15) which open into an exhaust or return chamber 221 of a fifth groove to finally be directed into a radial channel 219 leading into a longitudinal channel 217 and finally out of the distributor through any suitable means, as shown in FIG. 5.

It will of course be understood that a similar water distribution system is provided through both fluid controllers 35 for the two sets of half molds or dies. This is similar to the pressure oil system but is different from the air system which is provided only on one side of the machine and therefore only one controller 35 need be provided therewith, as aforesaid.

The invention further contemplates special means for moving the above-described mechanism on base 3 in order to adjust the molds centrally of the extruded parison. Such a device is particularly illustrated in FIGS. 11, 12 and 13 and will be seen to comprise a peripheral supporting angular member 227 welded or otherwise secured to the bottom of the lower housing and which supports the complete machine. The horizontal flange of angular member 227 rests on a series of ball bearings 229 (FIG. 11) secured to an upward flange 231 of base 3. Rotatably mounted across two of such flanges 231 is a shaft 233 preferably made of a hollow tubular section closed at each end by a plug 235 protruding therefrom and having an end engaging into a flange 231 in the manner particularly shown in FIG. 13.

A rocking lever 237 is secured on shaft 233 and more particularly on plug 235 to project upwardly and is provided, at the upper end therewith, with a lateral member 239 having a through threaded hole 241 for the reception of an operating threaded bar 243 (FIG. 12). The universal joint mechanism 245 rotatably mounts the threaded bar 243 on the housing 7 and, outwardly thereof, a handle 247 serves for causing rotation of mechanism 245 and consequently of rod 243, although the latter does not move axially.

From the above description, it will be understood that whenever threaded rod 243 is made to rotate through hole 241, this operation causes rocking lever 237 to pivot back and forth.

A connecting link 249 pivotally joins the said rocking lever 237 to a bracket 251 secured to the horizontal flange of supporting angular member 227. It will therefore be understood that whenever handle 247 is rotated, thus rocking lever 237, housing 7 will be brought into a motion depending on the direction of rotation of handle 247.

As shown in FIG. 11, tubular shaft 233 is provided at the other end with a second upward lever 237' somewhat shorter than lever 237 and to which is pivotally connected, at one end, a link 249', the other end of which is pivotally joined to a bracket 251' fastened to the supporting angular member 227. Thus, the movement caused by handle 247 is transferred on the other side of the machine whereby the latter may bodily be displaced and with accuracy.

Although a specific embodiment of the invention has just been described, it will be understood that various modifications may be made thereto without departing from the spirit of the invention, the scope of which is to be construed from the appended claims.

I claim:

1. In a blow-molding machine, the combination comprising:
 (a) a pair of upright parallel plates and means to rotate said plates in synchronism at constant equal speed about a horizontal axis;
 (b) a plurality of blow molds, each formed of a pair of complementary dies mounted on said plates for movement toward and away from each other;
 (c) a hydraulic ram corresponding to each die, said rams adapted to move the complementary dies of each pair in opposite directions to cause successive opening and closing of the corresponding mold; said rams including cylinders fixed to said plates and rods sliding through said plates and connected, at one end, to said dies; each ram having a fluid inlet end and a fluid outlet end;
 (d) means on each plate controlling pressure fluid actuating said rams; said means including:
  a cylindrical stationary fluid distributor coaxial with said plate;
  an outer sleeve mounted for rotation over said distributor and coaxially secured to said plate for rotation therewith;
  pressure fluid admission means and fluid exhaust means through said distributor and sleeve successively delivering and exhausting fluid alternatively at each fluid inlet and outlet ends to cause reciprocation of said dies to open and close said molds;
 (e) a nozzle for the extrusion of a plastic parison having a vertical longitudinal axis offset from said horizontal axis in the direction of rotation of said plates and molds; said pressure fluid control means constructed and arranged to cause closure of said molds over said parison, whereby to allow said molds to move away from said parison immediately after closure thereof to thus avoid accumulation of plastic material over the molds.

2. In a blow-molding machine, the combination comprising:
 (a) a pair of upright parallel plates and means to rotate said plates in synchronism at constant equal speed about a horizontal axis;
 (b) a plurality of blow molds, each formed of a pair of complementary dies mounted on said plates for movement toward and away from each other;
 (c) a hydraulic ram corresponding to each die, said rams adapted to move the complementary dies of each pair alternately in opposite directions to cause successive opening and closing of the corresponding mold; each ram including a cylinder secured to one of said plates, a piston rod to one end of which the corresponding die is fixed, said rod being displaceable in said cylinder and through said plate, a piston at the other end of said rod and a fluid port at each end of said cylinder and on opposite sides of said piston;
 (d) a fluid controller corresponding to each plate for controlling admission and exhaust of fluid to and from said cylinders through said ports and including:
  a stationary cylindrical fluid distributor coaxial with the corresponding plate;
  an outer sleeve mounted for rotation over said fluid distributor and coaxially secured to said plate for rotation therewith;
  said distributor having a first and a second circumferential groove cut around the outer periphery thereof;
  a pair of barriers in each groove dividing the said groove into a first and a second chamber; the length and position around said distributor of the first and second chambers of the first groove respectively corresponding to those of the first and second chambers of said second groove;
  pressure fluid admission channel means through said distributor opening into the first chamber of the first groove and the second chamber of the second groove;
  fluid exhaust channel means through said distributor opening into the second chamber of the first groove and the first chamber of the second groove;
  said outer sleeve having, for each ram, a pair of longitudinally aligned ducts extending through the wall thereof, one duct communicating with one groove and the other duct communicating with the other groove, said pairs of ducts being evenly spaced around said sleeve and connected to said cylinder fluid ports, and (e) a nozzle for the extrusion of a plastic parison having a vertical longitudinal axis offset from said horizontal axis in the direction of rotation of said plates and molds; said pressure fluid control means constructed and arranged to cause closure of said molds over said parison, whereby to allow said molds to move away from said parison immediately after closure thereof to thus avoid accumulation of plastic material over the molds.

3. A combination as claimed in claim 2, wherein the length of said first chambers is about ⅔ of the total length of said first and second groove respectively and the length of said second chambers is about ⅓ of the total length of said first and second groove, respectively.

4. In a blow-molding machine, the combination comprising:
 (a) a pair of upright parallel plates and means to rotate said plates in synchronism at constant equal speed about a horizontal axis;
 (b) a plurality of blow molds, each formed of a pair of complementary dies, with the dies of a pair mounted each on one plate for movement toward and away from each other to open and close the mold resulting therefrom;
 (c) a hydraulic ram corresponding to each die; each ram having a cylinder secured to one of said plates, a piston slidable therein and a piston rod connected respectively to the corresponding die and to said piston; said cylinder having a fluid port at each end thereof and on opposite sides of said piston;
 (d) a fluid controller corresponding to each plate for controlling admission and exhaust of fluid to and from the cylinders corresponding to each plate through said fluid ports, each controller including:
  a stationary cylindrical fluid distributor coaxial with the corresponding plate;
  an outer sleeve coaxially secured at one end to the corresponding plate and mounted over said fluid distributor;
  said distributor having a first and a second circumferential groove cut around the outer periphery thereof;
  a pair of barriers in each groove dividing the said groove into a first and a second chamber; the length and position around said distributor of the first and second chambers of the first groove respectively corresponding to those of the first and second chambers of said second groove;
  pressure fluid admission channel means through said distributor opening into the first chamber of the first groove and the second chamber of the second groove;
  fluid exhaust channel means through said distributor opening into the second chamber of the first groove and the first chamber of the second groove;
  said outer sleeve having pairs of ducts corresponding in number to the number of rams on one plate; the ducts of each pair being longitudinally aligned and extending through the wall of said sleeve with one duct communicating with one groove and the other duct communicating with the other groove, said pairs of ducts being evenly spaced around said sleeves;
 (e) fluid conduit means joining each such pairs of ducts with the fluid ports of a cylinder on said one plate, whereby as said sleeve rotates around said fluid distributor, each fluid port at one end of said cylinders is successively placed in communication with pressure fluid and exhaust while the fluid ports at the other end are simultaneously successively placed in communication with the exhaust and pressured fluid allowing the pistons to move back and forth in said cylinders, and;
 (f) a nozzle for the extrusion of a plastic parison having a vertical longitudinal axis offset from said horizontal axis in the direction of rotation of said plates and molds; said pressure fluid control means constructed and arranged to cause closure of said molds over said parison, whereby to allow said molds to move away from said parison immediately after closure thereof to thus avoid accumulation of plastic material over the molds.

5. A combination as claimed in claim 4, wherein the cylinders mounted on one plate are evenly spaced around said controller.

6. A combination as claimed in claim 4, wherein the length of said first chambers is about ⅔ of the total length of said first and second groove respectively and the length of said second chambers is about ⅓ of the total length of said first and second groove, respectively.

7. A combination as claimed in claim 4, including rods evenly disposed around the center of said plates and fixed thereto to synchronize the rotation thereof; each die being apertured and slidably mounted, through said aperture, on one of said rods for guiding the reciprocating motion thereof.

8. A combination as claimed in claim 7, including a lever secured transversely on said stationary distributor and means causing rocking of said lever to rotate said distributor to thus change the positioin of said chambers to vary the angular location of closure of said molds around said plates and over said parison for the molding of unsymmetrical articles.

9. A combination as claimed in claim 4, wherein:
 (g) one only of said distributors has a third continuous circumferential groove cut around the periphery thereof;
 (h) air channel means through said only distributor opening into said third groove;
 (i) air hose means, including for each die corresponding to said only distributor an air duct through said sleeve constantly in communication with said third groove and a hose connected to the corresponding die and adapted to send air to an article being blown;
 (j) an air valve mounted on said sleeve for rotation therewith and across said hose, adapted to control air to the corresponding die; and
 (k) means, synchronized with the rotation of said sleeve, to cause opening of said air valve only when the corresponding die is in closed position.

10. A combination as claimed in claim 9, wherein each air valve comprises a body and a through spool rotatably mounted in said body; an inlet port and an outlet port through said body; a pair of spaced longitudinal passageways in said spool adapted to place said ports into communication twice at every revolution of said spool; an exhaust passage in said spool adapted to place said outlet port in communication with exhaust twice per revolution of said spool and alternatively with said passageways.

11. A combination as claimed in claim 10, wherein said means of item (k) of claim 9 comprises:
 a member connected to the spool of said valve, outwardly of said body and having four radial arms;
 actuating prongs on said only stationary distributor with which said arms successively come in contact during rotation of said sleeve thereby causing rotation of said spool communicating said ports with said air duct and said outlet port with exhaust successively.

12. A combination as claimed in claim 11, including a transverse plate member fixed to said only stationary distributor and means mounting said prongs at selective locations on said plate member whereby the time of actuation of said valve may be varied by changing the location of said prongs on said plate member.

13. A combination as claimed in claim 9,
(l) each distributor further having a fourth and fifth continuous circumferential grooves cut out around the periphery thereof;
(m) water admission and return channel means through said distributor opening into said fourth and fifth grooves, respectively;
(n) water hose admission means including, for each die, a water admission duct through said sleeve constantly in communication with said fourth groove and a hose joining said groove to the corresponding die for cooling thereof;
(o) water hose return means including for each die, a water return duct through said sleeve constantly in communication with said fifth groove and a hose joining said groove to the corresponding die.

14. In a blow-molding machine, the combination comprising:
(a) a frame;
(b) two coaxial fluid controllers secured to said frame, respectively at each end thereof; each controller including a stationary horizontal cylindrical fluid distributor fixed to said frame and an outer sleeve mounted for rotation over said distributor;
(c) a pair of spaced parallel upright plates each fast with one of said rotatable sleeves of said controllers for rotation therewith about a horizontal axis;
(d) means interconnecting said plates to force all said sleeves and plates to rotate at equal speed;
(e) three blow molds evenly spaced between said plates, each formed of a pair of dies, with the dies of a pair mounted each on one plate for movement toward and away from one another to open and close the mold resulting therefrom;
(f) a hydraulic ram for each die, each having a cylinder secured to one of said plates on the side thereof opposite the corresponding die, a piston slidable in said cylinder and a piston rod connected respectively to the corresponding die and to said piston; said cylinder having a fluid port at each end thereof and on opposite sides of said piston;
(g) each distributor having first and second spaced circumferential grooves cut around the outer periphery thereof;
(h) a pair of barriers in each groove dividing the said groove into a first and a second chamber; the length and position around said distributor of the first and second chambers of the first groove corresponding respectively to those of the first and second chambers of said second groove and said first chambers being about ⅔ of the total length of said first and second grooves respectively and the length of said second chambers being about ⅓ of the total length of said first and second groove respectively;
(i) pressure fluid admission channel means through each distributor opening into the corresponding first chamber of the first groove and the second chamber of the second groove;
(j) fluid exhaust channel means through each distributor opening into the corresponding second chamber of the first groove and first chamber of the second groove;
(k) each outer sleeve having three pairs of radial ducts extending through said sleeve, evenly spaced therearound and with the axes of the ducts of a pair lying in a radial plane; one duct of each pair communicating with one groove and the other duct of the same pair communicating with the other groove;
(l) fluid conduit means joining each duct of a pair respectively with the fluid ports of one of the three cylinders on the corresponding plate, whereby as said sleeves rotate around their respective distributor, each fluid port at one end of said cylinders is successively placed in communication with pressure fluid for approximately ⅔ of a complete cycle and to exhaust for approximately ⅓ of the cycle while the other port at the other end of each cylinder is simultaneously successively placed in communication with the exhaust for ⅔ of a cycle and with fluid pressure for ⅓ of the cycle, causing two molds to be closed and one open at all times, and
(m) a nozzle for the extrusion of a plastic parison having a vertical longitudinal axis offset from said horizontal axis in the direction of rotation of said plates and molds; said pressure fluid control means constructed and arranged to cause closure of said molds over said parison, whereby to allow said molds to move away from said parison immediately after closure thereof to thus avoid accumulation of plastic material over the molds.

15. A combination as claimed in claim 14, including a base having upstanding flanges and rollers means on said flanges; said frame resting on said roller means to be displaced relative to said base and means to control said displacement.

16. A combination as claimed in claim 15, wherein said means comprises:
a shaft mounted for rotation between two opposed flanges;
an upstanding lever secured to said shaft;
a rotatable non-axially displaceable operating rod mounted on said frame;
threaded means interconnecting said rod and lever whereby rotation of said rod causes rotation of said lever and shaft, and
a link pivotally mounted on said lever, intermediate said rod and base, and on said frame, whereby rocking of said lever causes back and forth displacement of said frame relative to said base.

References Cited
UNITED STATES PATENTS

| | | | |
|---|---|---|---|
| 2,526,797 | 10/1950 | Ashbaugh | 18—20 X |
| 2,803,853 | 8/1957 | Brazier | 18—30 X |
| 3,005,231 | 10/1961 | Pechthold | 18—5 |

WILBUR L. McBAY, *Primary Examiner.*